April 29, 1958  G. A. LYON  2,832,644
WHEEL COVER
Filed March 17, 1954  2 Sheets-Sheet 1
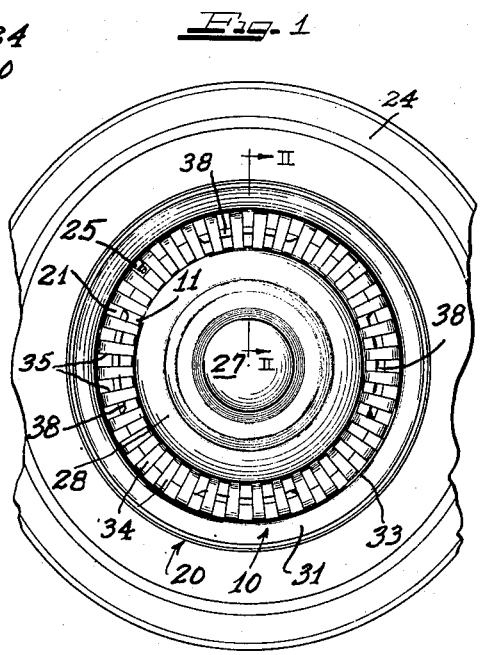
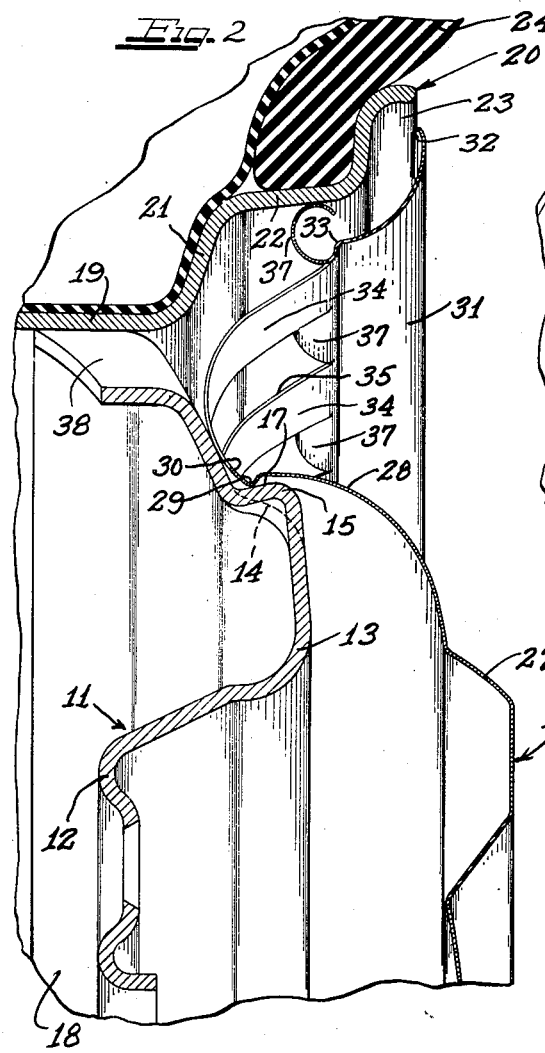
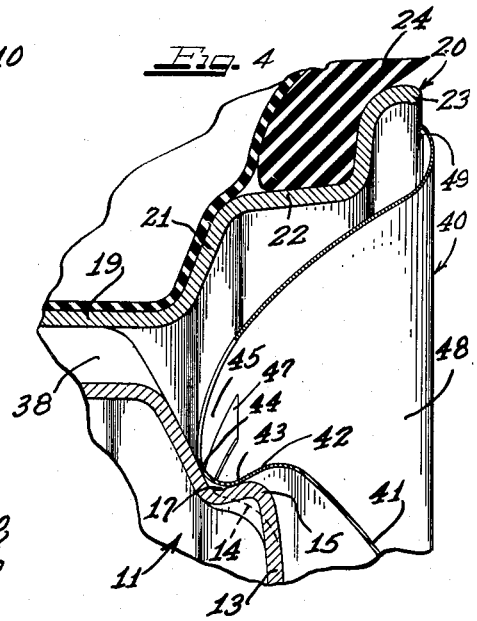
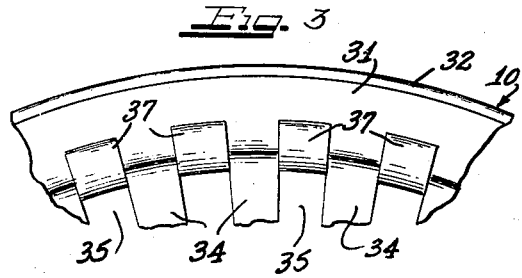
Inventor
GEORGE ALBERT LYON April 29, 1958     G. A. LYON     2,832,644
WHEEL COVER
Filed March 17, 1954     2 Sheets-Sheet 2
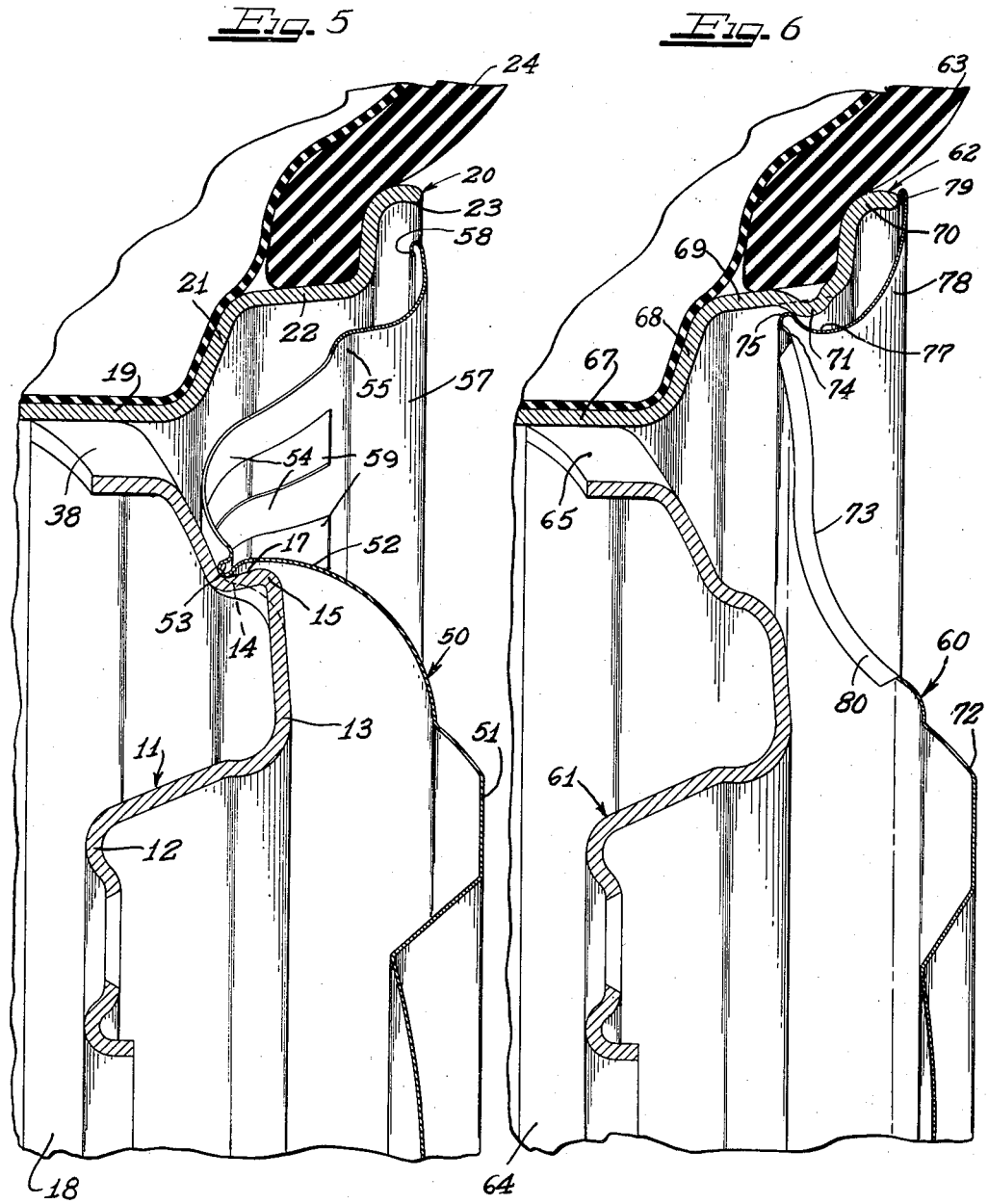
Inventor
GEORGE ALBERT LYON United States Patent Office 2,832,644
Patented Apr. 29, 1958

2,832,644

WHEEL COVER

George Albert Lyon, Detroit, Mich.

Application March 17, 1954, Serial No. 416,781

15 Claims. (Cl. 301—37)

The present invention relates to improvements in wheel structures and more particularly concerns the ornmental and protective covering of the outer sides of vehicle wheels.

An important object of the present invention is to provide an improved wheel structure having a novel cover for the outer side thereof.

A further object of the invention is to provide in a wheel structure having cover retaining bumps thereon a cover for disposition at the outer side of the wheel provided with improved means for self-retaining cooperation with the wheel bumps.

A further object of the invention is to provide an improved wheel cover of the full disk type having air circulation openings therethrough for cooperation with air circulation openings through a wheel and improved means for attachment of the cover to a wheel.

Yet another object of the invention is to improve the resilient retaining characteristics of bump engaging shoulder structure in a vehicle wheel cover.

Other objects, features and advantages of the present invention will be readily apparent from the following detailed description of certain preferred embodiments thereof taken in conjunction with the accompanying drawings, in which:

Figure 1 is a side elevational view of a wheel structure embodying features of the invention;

Figure 2 is an enlarged fragmentary sectional elevational view taken substantially on the line II—II of Figure 1;

Figure 3 is a fragmentary rear elevational view of the cover of Figures 1 and 2;

Figure 4 is a fragmentary radial sectional view through a modification of the wheel structure;

Figure 5 is a fragmentary radial sectional view through a wheel structure showing a further modification; and Figure 6 is a fragmentary radial sectional view through a wheel structure showing still another modification.

A wheel cover 10 (Figures 1, 2 and 3) is constructed and arranged to be applied to the outer side of a vehicle wheel which preferably embodies features of my Patent No. 2,445,330, issued July 20, 1948, and providing novel retaining bump structure for attachment of the cover to the wheel. To this end, the wheel comprises a disk spider wheel body 11 having a central dished bolt-on flange 12 by which the wheel is adapted to be attached to an axle structure of a vehicle. About the bolt-on flange is an annular axially outwardly directed reinforcing nose bulge 13 having at the radially outer side thereof a generally radially outwardly facing annular flange 14 provided with radially outwardly directed cover retaining bumps 15 provided with generally axially inwardly and radially outwardly facing oblique cover retaining shoulders 17 which even at their smallest diameter are radially outwardly offset from the shoulder 14. About the outer periphery of the wheel body 11 it is provided with an axially inwardly directed attachment flange 18 secured to a base flange 19 of a multi-flange drop center tire rim 20. From the outer side of the base flange 19 extends a generally radially outwardly and axially outwardly sloping side flange 21 merging with a generally axially outwardy and radially outwardly sloping intermediate flange 22 which joins a generally radially outwardly and then axially outwardly turned terminal flange 23. The tire rim 20 is adapted to support the pneumatic tire and tube assembly 24 having a valve stem 25 which projects in the customary way through the side flange 21 of the tire rim.

According to the present invention the cover 10 is made as a stamping from suitable sheet material such as stainless steel plate or strip or brass stock, and which material will lend itself to appropriate external finish such as polishing and plating. Centrally the wheel cover 10 has a crown portion 27 adapted to overlie the wheel body and more particularly the bolt-on flange 12 thereof and provide therewith a substantial chamber within which a hub projecting through the wheel is adapted to be accommodated. At its radially outer side the crown portion 27 is provided with a generally radially outwardly and axially inwardly turned resilient flange portion 28 which is adapted to overlie the nose bulge 13 of the wheel body and is disposable about the shoulder 14 of the wheel body in slightly spaced relation.

For attachment of the cover 10 to the outer side of the wheel, the axially inner marginal portion of the flange 28 is provided with an annular inturned attachment rib 29 of an inside diameter which is slightly less than the minimum diameter defined by the retaining shoulder 17 of the cover retaining bumps 15. At the axially inner side of the retaining rib 29, it is provided with a generally radially outwardly and axially inwardly sloping lead-in flange portion 30 which is engageable cammingly with the nose portions of the retaining bumps 15 as an incident to application of the cover to the outer side of the wheel. Then as axially inward pressure is applied to the cover the lead-in flange 30 cams the retaining rib 29 radially outwardly at the portions thereof engaging the retaining bumps to resiliently deflect the retaining rib, with corresponding radially inward deflection of those portions of the rib 29 and flange 28 intermediate the retaining bumps 15, until the retaining rib is moved axially inwardly beyond the tip of the nose portions of the retaining bumps and the retaining rib 29 shoulders against the retaining bump shoulder 17 and by resilient contraction of the retaining rib draws cammingly generally axially inwardly along the retaining bump shoulder 17 to enter into firm retaining engagement with the retaining bumps.

For covering the tire rim 20, the cover 10 is provided with a radially outer marginal substantially rib-like fairly rigid tire rim covering annular portion 31 provided at its outer terminal edge with an undertured reinforcing and finishing bead flange 32 adapted in assembly with the wheel to lie in adjacent spaced relation to the tip of the terminal flange 23 of the tire rim.

At its radially inner side the outer marginal portion 31 of the cover is provided with a rigid annular indented reinforcing rib 33 joined at its radially inner side with the inner cover portion by means of a series of radially extending generally rib-like bowed resilient connecting elements 34 formed integrally in one piece therewith and at their radially inner ends connected as extensions from the edge of the lead-in flange portion 30. Since the spoke-like connecting portions 34 are of limited width and separated one from the other they are of substantial resilience and readily resiliently yieldable as an incident to radial resilient deflections of contiguous portions of the retaining rib 29 of the cover incident to application or removal of the cover with respect to the retaining bumps 15. In addition, by virtue of the resilience inherent in the ribs 34, they exert radial thrust toward the retaining rib 29 and thus enhance the resilient tensioned engagement of the retaining rib 29 with the shoulders 17 of the retaining bumps. It will also be observed that the portions of the inwardly bowed ribs 34 adjacent to the juncture thereof with the lead-in flange 30 bottom against the wheel body resiliently as an incident to the final attached relationship of the cover to the wheel. This further enhances the resilient tensioning cooperation of the spokes 34 with the retaining rib 29 of the cover. It will also be observed that the spoke portions 34 support the radially outer cover portions 31 in spaced relation to the tire rim.

For removing the cover from the wheel, a pry-off tool such as a screwdriver or the like (not shown) may be inserted behind the outer marginal portion 31 of the cover and levered against the outer turned reinforcing bead 32 thereof and against the reinforcing annular shoulder 33 to exert axially outward pressure on the cover. As such pry-off pressure is applied, the resilient spoke elements 34 yield resiliently and effect radially outward tension on the retaining rib 29 of the cover through the flange 30, tending to release the grip of the retaining flange on the adjacent retaining bump shoulders 17 and thus work the cover free from the retaining bumps until the retaining rib 29 pops free from the retaining bumps.

By preference the spoke elements 34 are substantially spaced apart, at least sufficiently to enable passage therethrough of the valve stem 25, as seen in Fig. 1.

In order to avoid turning of the cover 10 on the wheel and thereby possible twisting of the valve stem 25, means are provided for engagement against the tire rim. To this end, portions of the cover intermediate the spoke elements 34 and derived from material struck out in providing openings 35 between the spoke elements is utilized to form axially inwardly and radially outwardly and then axially outwardly turned resilient expansible and contractible tire rim engaging curled shouldering elements 37 extending integrally in one piece from the radially inner side of the reinforcing shoulder 33. The shouldering curls 37 are formed to a normal diameter which is greater than the inside diameter of at least the axially outer portion of the intermediate flange 22 of the tire rim. Hence, as an incident to axially inward disposition of the cover 10 on the wheel, the shouldering curls 37 shoulder against the intermediate flange 22 and as the cover is pressed inwardly the shouldering curls are caused to contract or curl up in radially outward thrusting resilient tensioned engagement with the intermediate flange. This not only cushions the radially outer portion 31 of the cover and resists any tendency to flutter or vibrate in service, but also serves to resist turning of the cover on the wheel by reason of the substantial number of the shoulder curls 37 thrusting frictionally against the intermediate flange. Furthermore, by striking out the shoulder curls 37 in the formation of the openings 35 in a manner such that the burrs at the side edges of the shoulder curls will be directed toward the intermediate flange 22 in assembly additional turn resistance is effected by the action of the burrs tending to bite into the opposing surface of the intermediate flange of the tire rim.

By virtue of the spaced relation of the radially outer portion 31 of the tire rim, and the substantial openings through the intermediate portion of the cover afforded by the openings 35, air circulation through and behind the cover is greatly facilitated so as to promote air circulation through the wheel which is provided at suitable spaced intervals such as four with wheel openings 38 provided by suitable inset areas in the attachment flange 18 of the wheel body.

In the modification of Figure 4, the wheel including the wheel body and the tire rim are substantially the same as shown in Figure 2 and therefore similar reference numerals designate similar parts of the structure.

To the outer side of the wheel, in this modification, is applied a wheel cover 40 which is, similarly as the cover 10, made from suitable sheet material stamped or drawn to shape from a single sheet or piece and having self-retaining means engageable with the retaining bumps 15 on the wheel. To this end, the cover 40 comprises a central crown portion 41 for overlying the wheel body and having a marginal generally axially and radially inwardly extending resilient flange portion 42 leading into a generally radially inwardly directed retaining rib 43 of concave-convex cross-section and extending annularly about the intermediate portion of the cover for engaging in resilient press-on pry-off relation with the retaining shoulders 17 of the retaining bumps. Extending generally radially outwardly and axially inwardly from the shoulder rib 43, that is at the axially inner side of the rib, is a lead-in flange 44 which is adapted to cammingly engage with the nose portions of the retaining bumps 15 during press-on of the cover. Extending integrally from the outer edge of the flange 44 is a uniform series of spaced generally radially extending spoke-like resilient longitudinally bowed elements 45 having therebetween openings 47. The spoke elements lie generally opposite the wheel openings 38 and therefore the openings 47 in the cover generally register in opposed relation with the wheel openings 38 for air circulation through the cover.

At their radially outer ends the spoke elements 45 join integrally in one piece with an annular radially outer cover portion 48 of a diameter to overlie the tire rim 20 and terminating in an outer edge underturned reinforcing and finishing bead 49 adapted to lie in assembly in adjacent spaced relation to the tip of the terminal flange 23.

In applying the cover 42 to the wheel, the lead-in flange 44 is substantially centered with respect to the nose portions of the retaining bumps 15 and is cammed inwardly along the noses of the bumps to effect resilient radially outward deflection of those portions of the lead-in flange 44 and the retaining rib shoulder 43 of the cover which engage the bumps 15. After the retaining shoulder 43 has snapped behind the noses of the retaining bumps 15 the retaining rib 43 contracts cammingly along the sloping faces of the shoulder 17 of the retaining bumps until the cover is drawn axially inwardly and the lead-in flange 44 bottoms against the wheel body 11. In the radial flexing of the retaining shoulder rib 43 and the lead-in flange 44, the resilient spokes 45 flex to relieve the flexing of the retaining shoulder and then by the resilient tensioning of the spokes 45 thrust generally radially inwardly to enhance the resilient tension of the retaining shoulder 43 on the retaining bumps.

For removing the cover 40 from the wheel a pry-off tool may be inserted behind the outer reinforced margin 49 of the substantially rigid outer annular cover portion 48 and axially outward pry-off force applied to the cover.

Having reference to Figure 5, a modified cover 50 is applied to the outer side of a vehicle wheel which in essential respects is the same as the wheel of Figures 2 and 4 and therefore similar reference numerals have been applied to indicate similar parts.

The cover 50 comprises a central crown portion 51 having a marginal inwardly axially directed resilient flange 52 adapted to encircle the wheel shoulder 14 in spaced relation about the retaining bumps 14. At its inner terminus, the resilient flange 52 is provided with an annular return bent generally axially and radially inwardly directed bead-like cover retaining rib 53 of resilient characteristics and of a normal diameter slightly less than the minimum diameter described by the retaining bump shoulders 17. The retaining bead rib 53 extends at its outer side generally axially and radially outwardly and has connected thereto integrally in one piece a series of inwardly bowed spaced spoke-like resilient elements 54 connected at their radially outer ends to an inwardly dished annular reinforcing rib 55 at the radially inner side of a radially outer annular convexly formed rib-like outer marginal cover portion 57 having its terminus turned under to provide a reinforcing and finishing bead 58 at the outer edge of the cover spaced in assembly in adjacent relation to the tip of the terminal flange 23 of the tire rim. It will be observed that the spoke elements 54 and the outer marginal portion 57 of the cover generally overlie the tire rim 20.

In applying the cover to the outer side of the wheel, the retaining bead rib 53 is generally centered with respect to the nose portions of the retaining bumps 15 and the cover is then pressed axially inwardly so that the retaining bead will cam over the noses of the nose portions by radially outward resilient deflection of the retaining bead 53 and the contiguous portions of the cover flange 52, coupled with resilient yielding of the adjacent spoke or spoke elements 54. Then as the retaining bead rib 53 passes on to the retaining shoulders 17 of the retaining bumps, the retaining bead contracts thereagainst and pulls the cover into retaining position on the wheel with at least the portions of the bead 53 intermediate the retaining bumps 15 bottoming against the wheel body 11. The spoke elements 54, of course, resiliently thrust toward the retaining rib bead 53 and thus enhance the resilient retaining engagement thereof with the retaining bumps 15.

Intermediate the spokes 54 openings 59 of substantial width and length are provided which in assembly are generally opposite the wheel openings 38 in the wheel so that air circulation is enhanced through the cover and the wheel.

Pry-off of the cover 50 may be effected by applying a pry-off tool behind the reinforced outer annular cover portion 57. On the other hand, the retaining rib bead 53 is accessible through the radially inner ends of the cover openings 59 and the pry-off tool such as a screwdriver may be applied directly to the retaining rib 53 through one of the openings and a twisting and levering action applied to the bead may be utilized for prying the bead free from the retaining bumps 15.

In the modification of Figure 6, a cover 60 is applied to the outer side of a vehicle wheel comprising a wheel body 61 which may be of the disk spider type and which carries a multi-flange tire rim 62 supporting a pneumatic tire and tube assembly 63. At its outer margin the wheel body 61 has an axially inwardly directed attachment flange 64 provided at spaced intervals with inset portions 65 defining air openings, while intermediate the openings the flange is attached to a base flange 67 of the tire rim. From the base flange extends a tire rim side flange 68 joining a generally axially outwardly directed and radially outwardly sloping intermediate flange 69 which merges with a terminal flange 70 of the tire rim. In this instance the axially outer side of the intermediate flange 69 of the tire rim is provided with a series of spaced generally radially inwardly directed cover retaining bumps 71.

The cover 60 is stamped from suitable resilient sheet material such as stainless steel or brass or the like and appropriately surface finished. In an economical structure, the cover 60 is made from a single piece or plate of the sheet material and comprises a stamping including a central crown portion 72 connected by a series of generally radially outwardly and axially inwardly directed bowed ribs 73 to a radially inner narrow flange 74 provided at the radially inner side of a return bent generally axially inwardly and radially outwardly connected resilient bead-like intermediate retaining rib 75 formed on the inner terminus of a generally axially inwardly directed resilient flange portion 77 of a radially outer generally axially and radially outwardly directed annular marginal cover portion 78 which is adapted to overlie the terminal flange 70. At its outer extremity, the outer marginal cover portion 78 has a turned under finishing and reinforcing bead flange 79 which in assembly is adapted to lie against the tip of the terminal flange 70 of the tire rim.

In applying the cover 60 to the outer side of the wheel, the retaining rib 75, which is of a maximum diameter slightly greater than the diameter of the axially inner sides of the retaining bumps 71, is applied to the axially outer side of the retaining bumps 71 and the cover is then pressed axially inwardly to effect resilient radially inward deflection of those portions of the retaining rib 75 that engage the retaining bumps 71 and corresponding radially inward resilient deflection of the contiguous portions of the cover flange 77 and the adjacent integral spokes 73. As the bead rib 75 snaps behind the bumps 71, against the generally radially outwardly and axially inwardly sloping retaining shoulders of the bumps, the retaining bead 75 expands and resiliently draws the cover axially inwardly until the outer turned edge 79 of the cover bears against the tip of the terminal flange 70 and thus retains the resilient retaining rib 75 under resilient tension against the inner sides of the retaining bumps 71. Of course, the spokes 73 thrust radially outwardly to enhance the resilient retaining interengagement of the retaining bead rib 75 with the retaining bumps 71.

It will be observed that the spokes 73 are opposite the wheel openings 65 and substantial openings are afforded between the spokes 73 so that air circulation through the cover and through the wheel is provided for.

In order to enhance the retaining thrust resilient characteristics of the spokes 73, inturned flanges 80 along the longitudinally extending edges of the spokes may be provided. These flanges are provided in a manner to enhance the resiliency of the spokes rather than to rigidify the spokes.

Removal of the cover 60 from the wheel may be effected by applying a pry-off tool behind the reinforced outer edge 79 of the cover and exerting pry-off force to dislodge the retaining rib 75 from the retaining bumps 71.

In all forms of the cover shown, the spoke elements may, if desired, be twisted or turned up in either direction to effect air circulation vane or louver action thereof in the rotation of the wheel so as to promote positive air circulation through the cover and the wheel. Moreover, in all forms of the cover shown, the spokes which are separated by substantial width air openings are also of substantial width and are longitudinally flexibly yieldable conformable to resilient flexing of the retaining rib or shoulder structure toward which the resilient spoke elements thrust.

It will be understood that modifications and variations may be effected without departing from the scope of the novel concepts of the present invention.

I claim as my invention:

1. In a wheel structure including a wheel body member and a tire rim member with cover retaining bumps on one of said members, a cover for disposition at the outer side of the wheel comprising a cover plate having an intermediate annular rib retainingly engageable with the retaining bumps under resilient tension, and a series of separate spoke elements connected to said retaining rib at one end and to a spaced portion of the cover at their opposite ends and resiliently thrusting toward said retaining shoulder when in engagement with the retaining bumps, said cover having an edge behind which a pry-off tool is engageable and a generally axially inwardly projecting substantially rigid pry-off shoulder being provided on the cover spaced radially inwardly from said edge for engagement by the pry-off tool.

2. In a wheel structure including tire rim and body parts with cover retaining bumps on one of said parts with generally axially inwardly facing bump shoulders, a cover for disposition at the outer side of the wheel comprising a cover plate for covering both of said parts and having an intermediate generally axially inwardly directed flange terminating in a cover retaining shoulder rib having a generally axially outwardly facing side engageable under resilient deflection of the rib with the retaining bumps, and said rib having extending therefrom away from said cover flange and connected to a spaced portion of the cover generally radially resiliently yieldable spoke portions thrusting resiliently toward the bump engaging portions of the shoulder rib, said rib having a generally axially inwardly facing side engageable against an underyling portion of the wheel adjacent to said bumps for determining the axially inward disposition of the cover and maintaining the rib in cover-retaining disposition relative to the bumps.

3. In a wheel structure including tire rim and body parts with cover retaining bumps on one of said parts, a cover for disposition at the outer side of the wheel comprising a cover plate for covering both of said parts and having an intermediate generally axially inwardly directed flange terminating in a cover retaining shoulder rib engageable under resilient deflection with the retaining bumps and having extending therefrom away from said cover flange and connected to a spaced portion of the cover generally radially resiliently yieldable spoke portions thrusting resiliently toward the bump engaging portions of the shoulder rib, said spoke portions being of substantial width and having openings of substantial width therebetween for circulation of air through the cover, the longitudinal section of the spokes being sinuous on a large radius for resilient deflectability.

4. In a wheel structure including tire rim and body parts with cover retaining bumps on one of said parts, a cover for disposition at the outer side of the wheel comprising a cover plate for covering both of said parts and having an intermediate generally axially inwardly directed flange terminating in a cover retaining shoulder rib engageable under resilient deflection with the retaining bumps and having extending therefrom away from said cover flange and connected to a spaced portion of the cover generally radially resiliently yieldable spoke portions thrusting resiliently toward the bump engaging portions of the shoulder rib, said spoke portions being of substantial width and having openings of substantial width therebetween for circulation of air through the cover, said spaced cover portion having thereon curled abutment shoulder elements derived from material struck from the cover in the formation of said openings and engaging in resilient thrusting relation with the remaining of said wheel parts.

5. In a wheel structure including a tire rim having an intermediate flange and a wheel body having a generally radially outwardly facing annular shoulder with radially outwardly directed cover retaining bumps thereon, a cover for disposition at the outer side of the wheel comprising a plate having radially inner and outer portions for respectively disposition over the wheel body and over the tire rim and connected together in one piece by resilient generally radially extending spaced spoke elements, the radially inner of the cover portions having a generally axially extending resilient flange provided at the radially inner ends of said spoke elements with an annular generally radially inwardly directed cover retaining rib engageable resiliently with the retaining bumps, the radially outer of said cover portions having integral therewith underturned shoulder curls derived from material struck from the openings between the spokes and thrusting resiliently against the tire rim intermediate flange.

6. In a wheel structure including a tire rim having an intermediate flange and a wheel body having a generally radially outwardly facing annular shoulder with radially outwardly directed cover retaining bumps thereon, a cover for disposition at the outer side of the wheel comprising a plate having radially inner and outer portions for respectively disposition over the wheel body and over the tire rim and connected together in one piece by resilient generally radially extending spaced spoke elements, the radially inner of the cover portions having a generally axially extending resilient flange provided at the radially inner ends of said spoke elements with an annular generally radially inwardly directed cover retaining rib engageable resiliently with the retaining bumps, the radially outer of said cover portions having integral therewith underturned shoulder curls derived from material struck from the openings between the spokes and thrusting resiliently against the tire rim intermediate flange, said shoulder curls having burrs at the edges thereof directed into engagement with the intermediate flange for assisting in holding the cover against turning on the wheel.

7. In a wheel structure including a wheel body member and a tire rim member for supporting a pneumatic tire and tube assembly with a valve stem projecting therefrom through a side flange on the tire rim, one of said wheel members having cover retaining bumps thereon, a cover for disposition at the outer side of the wheel comprising a cover plate having an intermediate cover retaining annular shoulder structure engageable with said retaining bumps on said one member and with generally radially extending spokes cooperating in resiliency enhancing relation with said shoulder, said spokes having substantial air openings therethrough, the valve stem being accommodated to project through one of said openings, and means pressed from the cover plate and engageable with one of the wheel members for retaining the cover against turning relative to the wheel.

8. In a wheel structure including a tire rim and a wheel body for supporting a pneumatic tire and tube assembly on the tire rim with a valve stem projecting therefrom through a side flange on the tire rim, a cover for disposition at the outer side of the wheel comprising a cover plate having an intermediate cover retaining annular shoulder structure engageable with retaining bumps on the wheel and with an intermediate portion of the cover comprising generally radially extending spokes with substantial air openings therethrough, the valve stem being accommodated to project through one of said openings, the radially outer portion of the cover having means thereon engaging the tire rim for restraining the cover against turning on the wheel in service to thus prevent twisting of the valve stem projecting through said one opening.

9. In a cover for disposition at the outer side of a vehicle wheel, a cover plate having an intermediate generally axially extending resilient flange terminating at its axially inner portion in a generally radially projecting annular cover retaining rib engageable under resilient tension with retaining bumps on a wheel, said retaining rib having extending generally radially therefrom integral in one piece with the remainder of the cover a series of generally radially extending radially yieldable resilient spokes thrusting toward said rib to resist resiliently radial deflection of the rib toward said spokes, and resilient means pressed from the cover plate for engaging a generally radially opposing portion of the wheel for aiding in centering the cover over the wheel when inserting the cover in place.

10. In a wheel structure including a wheel body and a tire rim with cover retaining bumps on a generally radially inwardly facing flange of the tire rim and projecting generally radially inwardly and spaced axially outwardly from a generally axially outwardly facing flange of the rim, a cover member for disposition at the outer side of the wheel including a generally axially extending portion of a diameter to fit generally telescopically within said radially facing rim flange and joining an annular portion extending generally radially inwardly therefrom, with an annular bump engaging continuous resiliently radially flexible rib projecting generally radially outwardly for cover retaining engagement behind said retaining bumps in resiliently flexible press-on, pry-off relation, said annular cover portion being divided into a plurality of resilient sections arranged to overlie said axially outwardly facing rim flange and resiliently cooperating with the axially inner side of said rib for retaining the rib in cover engaging relation to the bumps.

11. In a cover for disposition at the outer side of a vehicle wheel, a cover plate having an intermediate generally axially extending resilient flange terminating at its axially inner portion in a generally radially projecting annular cover retaining rib engageable under resilient tension with retaining bumps on a wheel, said retaining rib having extending generally radially therefrom integral in one piece with the remainder of the cover a series of generally radially extending radially yieldable resilient spokes thrusting toward said rib to resist resiliently radial deflection of the rib toward said spokes, said spokes having substantial openings therebetween for air circulation through the cover, the portion of the cover to which the spokes are connected remote from the rib having underturned portions struck from the openings and engageable in resilient thrusting relation with a part of the wheel to which the cover may be applied.

12. In a cover for disposition at the outer side of a vehicle wheel, a one piece sheet metal cover plate having intermediately thereon an annular generally axially extending resilient flange provided at its axially inner part with a generally return bent open bead-like resilient wheel bump engaging shoulder rib, and with the portion of the cover to which the rib is connected beyond said flange being provided with a series of radially extending separated resiliently yieldable spoke-like elements enabling resilient radial deflection of the rib in passing over cover retaining bumps on a wheel.

13. In a wheel structure including a tire rim and a wheel body, a cover for disposition at the outer side of a wheel comprising a body of thin resilient material having an outer marginal portion engageable against the tip of the tire rim and provided with a generally axially inwardly directed resilient flange terminating in an intermediate generally radially outwardly directed resilient annular rib for engaging with radially inwardly directed retaining bumps on a flange of the tire rim and coacting with the retaining rib on the cover to draw said outer marginal portion against the tip of the tire rim, and a portion of the cover radially inwardly adjacent to said rib being subdivided into resilient spoke-like portions thrusting endwise toward and coacting with said rib to enhance the resilient bump engaging thrust thereof.

14. In a wheel structure including a tire rim and a wheel body, a cover of thin resilient material for disposition at the outer side of the wheel comprising an intermediate generally axially inwardly directed radially flexible resilient flange having at the axially inner side thereof a generally radially directed continuous annular retaining rib shoulder engageable under resilient tension with retaining bumps on the wheel, a portion of the cover radially outwardly from said rib shoulder being engageable with the wheel for holding the retaining rib shoulder in resiliently tensioned engagement with the retaining bumps, and resiliency enhancing spoke-like portions on the cover connected at their ends adjacent to and cooperative by endwise thrust with said shoulder for enhancing the resilient engagement of the shoulder with the retaining bumps.

15. In a cover for disposition at the outer side of a vehicle wheel, a cover plate having an intermediate generally axially extending resilient flange terminating in an intermediate annular cover retaining rib directed generally radially and having an oppositely generally radially extending lead-in flange engageable cammingly with the retaining bumps on a wheel and having extending therefrom resilient spoke-like elements connected at their opposite ends with a circular portion of the cover spaced from said resilient flange, said lead-in flange providing a shoulder facing generally axially inwardly and engageable in bottoming relation against an opposing surface of the wheel for retaining the rib in retaining engagement with the retaining bumps.

References Cited in the file of this patent

UNITED STATES PATENTS

| | | |
|---|---|---|
| 2,244,913 | Lyon | June 10, 1941 |
| 2,308,617 | Lyon | Jan. 19, 1943 |
| 2,368,238 | Lyon | Jan. 30, 1945 |